Sept. 3, 1940.　　　P. J. LATHROP　　　2,213,317
WELDING METHOD AND APPARATUS
Filed Sept. 3, 1937　　　9 Sheets-Sheet 1

INVENTOR:
Palmer J. Lathrop.
BY
his ATTORNEY.

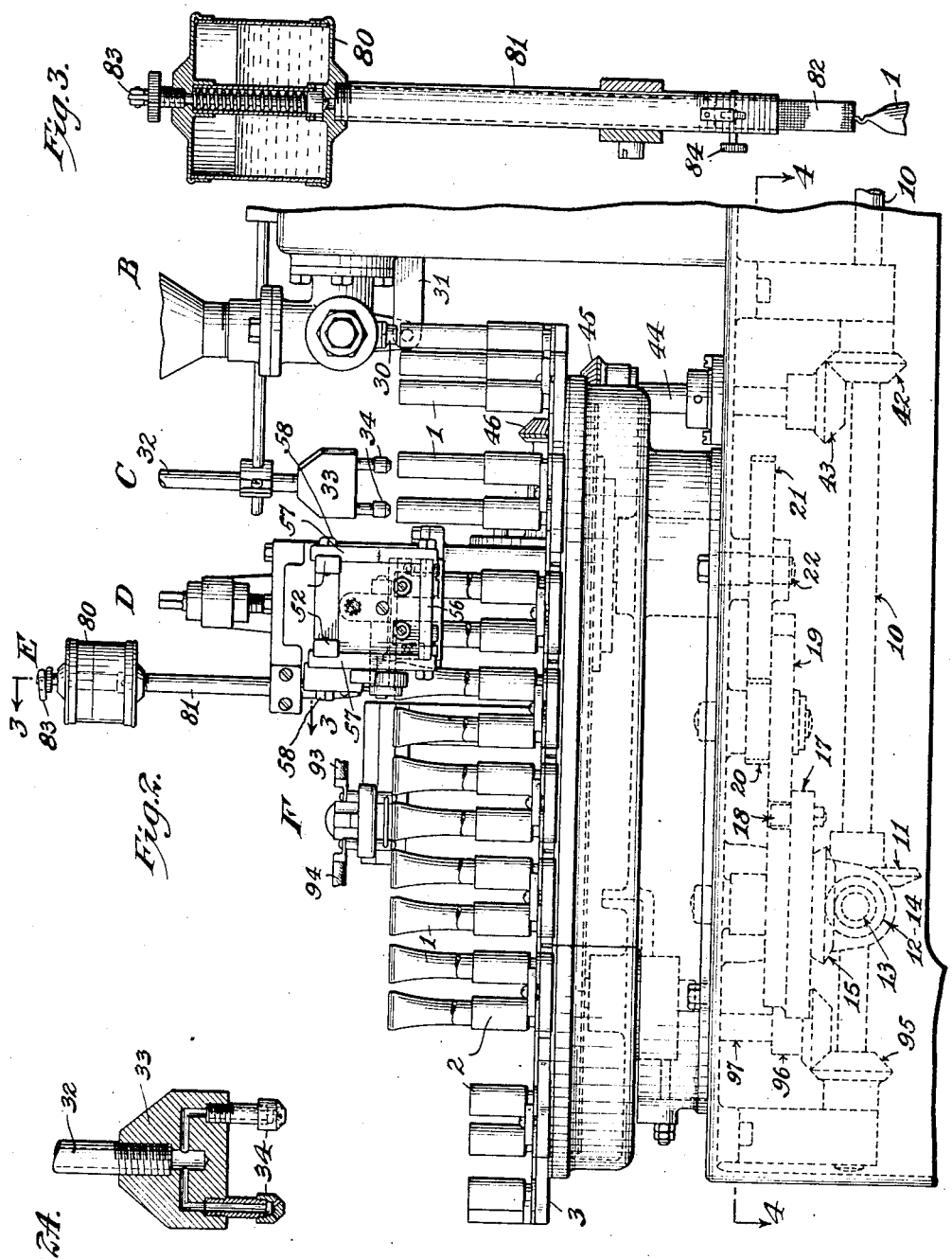

Sept. 3, 1940. P. J. LATHROP 2,213,317
WELDING METHOD AND APPARATUS
Filed Sept. 3, 1937 9 Sheets-Sheet 3

INVENTOR:
Palmer J. Lathrop
BY
his ATTORNEY

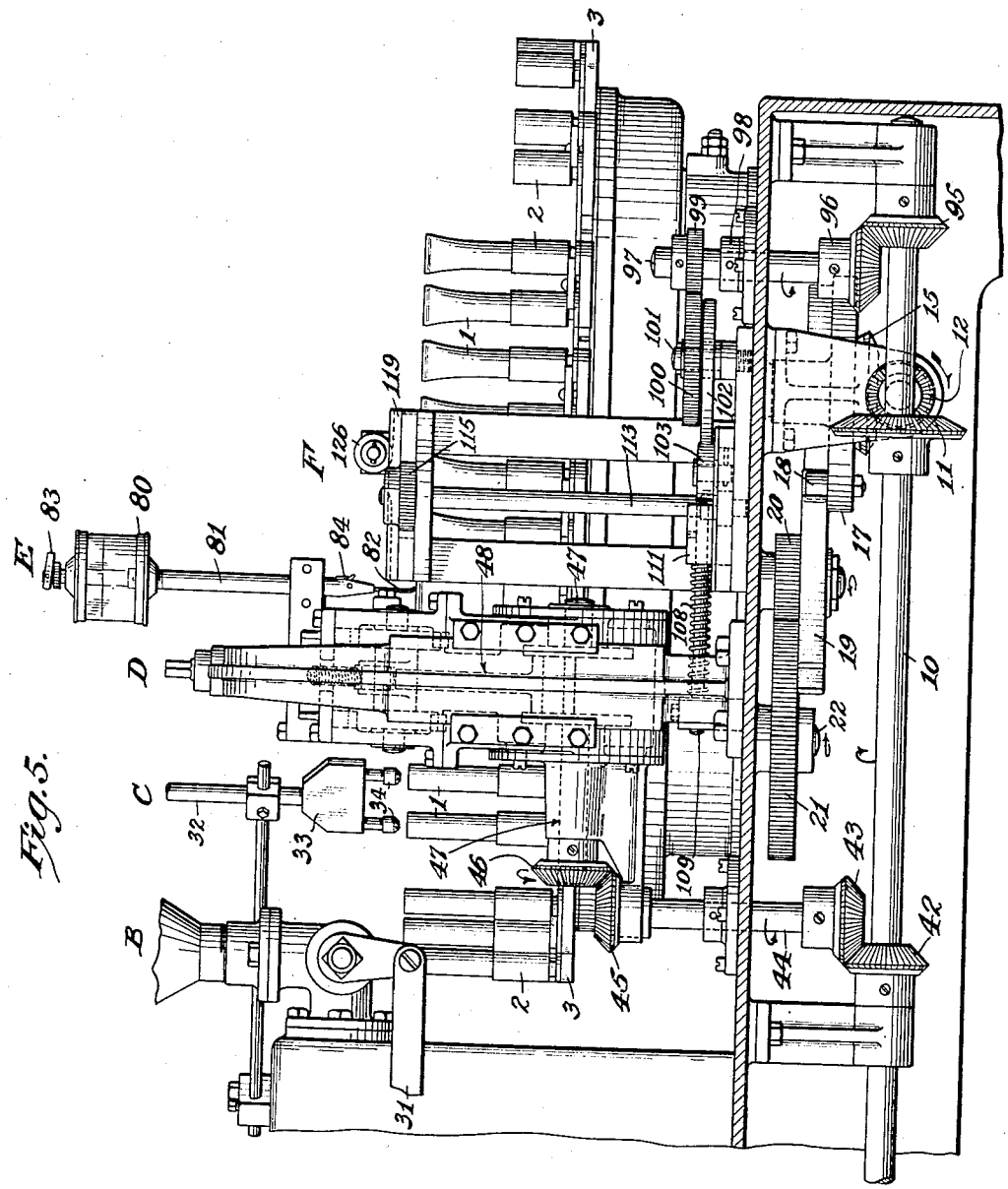

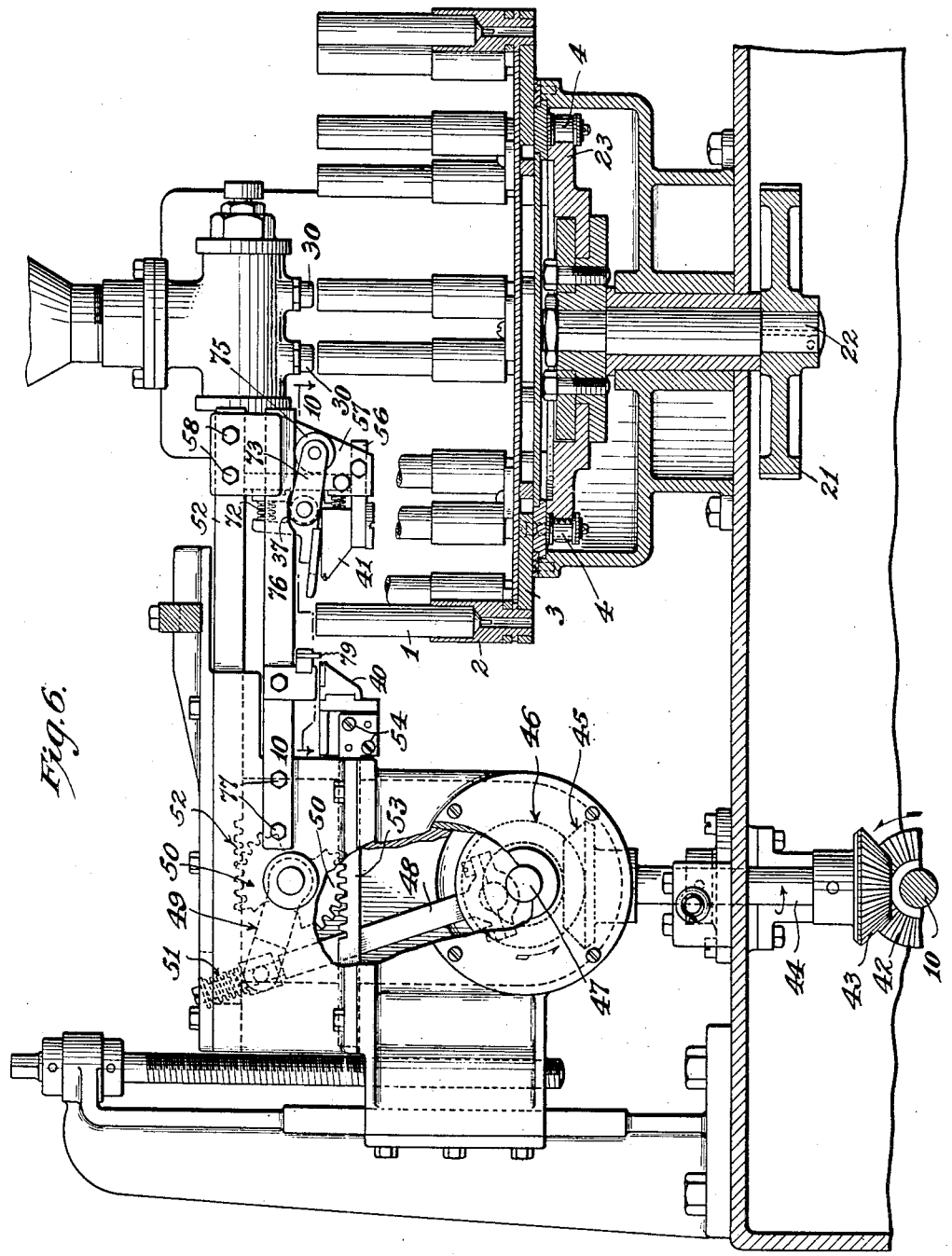

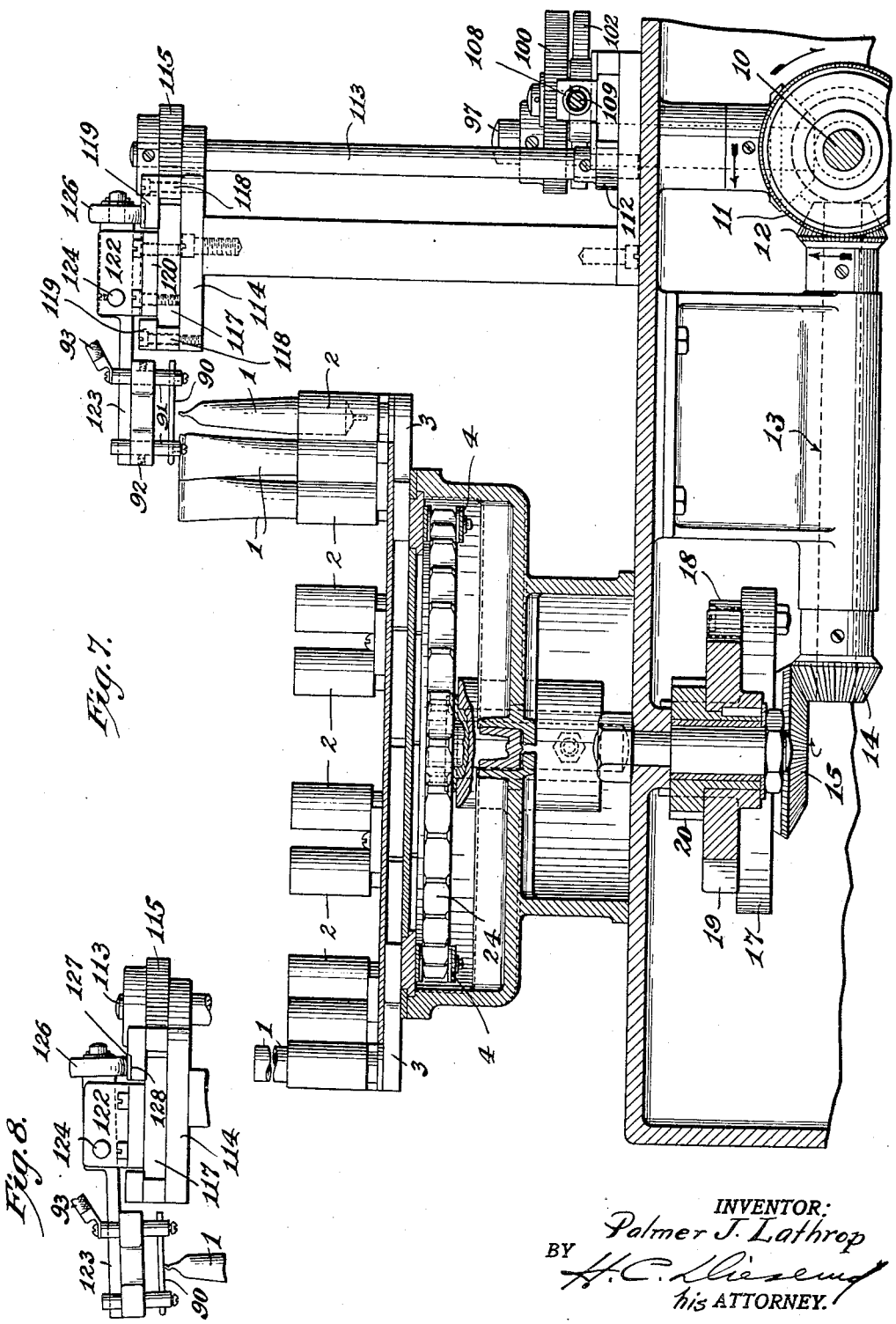

INVENTOR:
Palmer J. Lathrop
BY H.C. ...
his ATTORNEY.

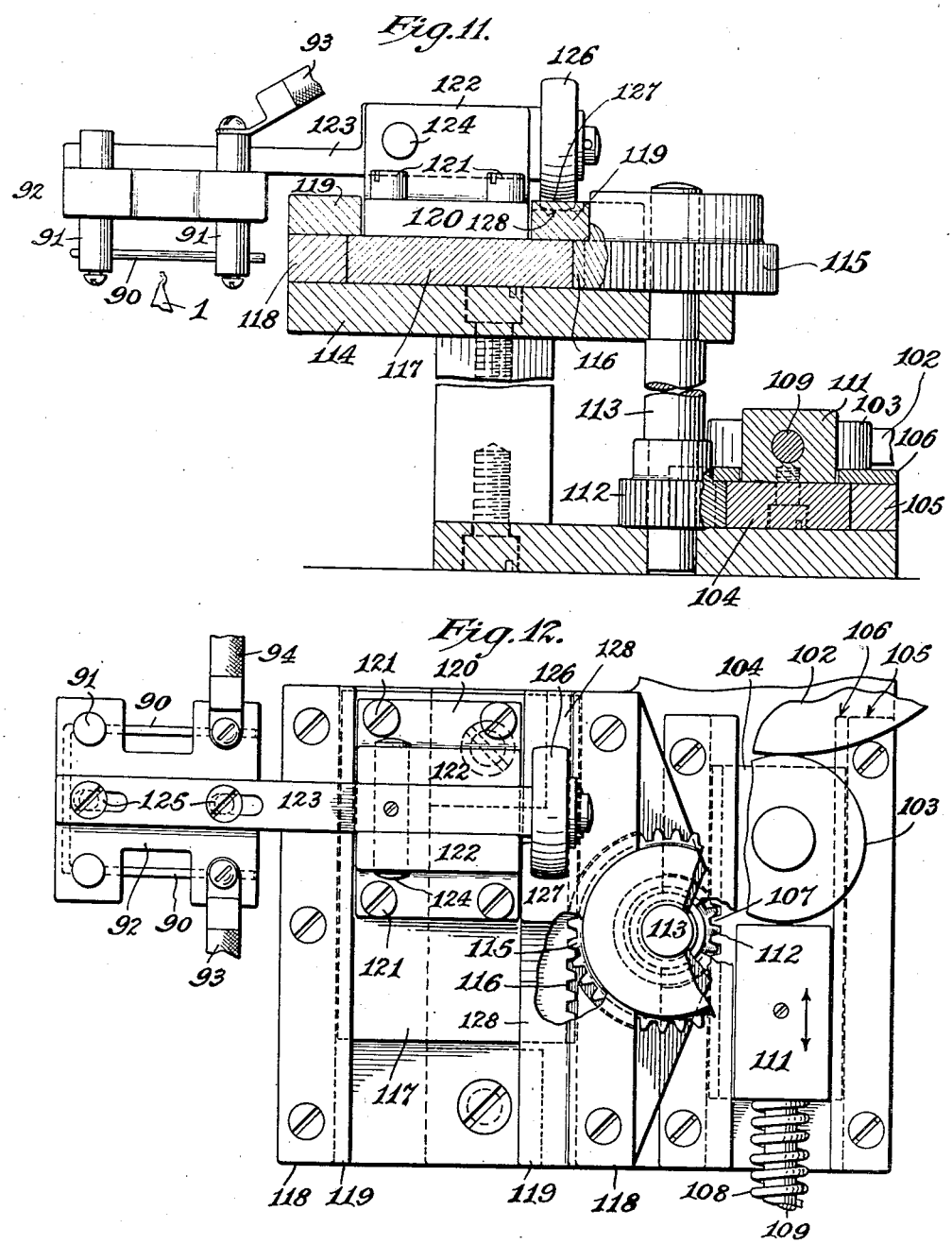

Sept. 3, 1940.    P. J. LATHROP    2,213,317
WELDING METHOD AND APPARATUS
Filed Sept. 3, 1937    9 Sheets-Sheet 9

INVENTOR:
Palmer J. Lathrop
BY H. C. Liesing
his ATTORNEY.

Patented Sept. 3, 1940

2,213,317

UNITED STATES PATENT OFFICE 2,213,317

WELDING METHOD AND APPARATUS

Palmer Jadwin Lathrop, Summit, N. J.

Application September 3, 1937, Serial No. 162,289

12 Claims. (Cl. 113—1)

This invention relates to an improved method and apparatus for welding and particularly to the autogenous welding of metals and alloys having low melting points. It is especially adapted for hermetically sealing containers, collapsible tubes and the like, of tin, lead and other materials, including the so-called "coated" tubes which, for example, may be made of lead coated with tin and the invention will be described as applied to such devices.

It has heretofore been customary, after collapsible tubes have been filled, to squeeze the upper part of the tube until the top edges were brought together and then to bend over, or crimp, these edges so as to prevent the contents from leaking out. Sometimes these edges have been held together by a separate clip. It has been suggested that the aforementioned folding, crimping and clipping arrangements may be further supplemented by the application to the tube of a thermoplastic material which, upon the application of heat sufficient to melt or soften the thermoplastic material, assists in giving tightly closed tubes. However, experience has shown that none of these methods produce a seal which is effective in all instances in protecting the contents from the outside atmosphere which is often deleterious to the product. Nor do they prevent the eventual seepage of some of the contents between the folded edges and even to the outer surface of the containers which renders the package unsightly and unsalable.

Furthermore, thermoplastics add little to the strength of the seals and are not universally resistant to the many types of products which could otherwise be packaged in tubes. In some instances the presence of the thermoplastic may be harmful to the products, or the latter may be a solvent of the thermoplastic.

One object of the present invention is to provide a simple and effective process and apparatus whereby thin sheets or foil of tin, lead, and other metals and alloys with a relatively low melting point can be fused or bonded together to form a strong tight joint.

Another object of the invention is to provide an apparatus and method whereby the open, or filling, ends of containers, collapsible tubes and the like, may be sealed so as to prevent the escape of even the lightest liquids with which the tubes may be filled and to provide an exceptionally strong package.

In the preferred arrangements of the present invention the union of the edges to be bonded together is effected by autogenous welding, but it is to be understood that the desired results may be accomplished by other sealing methods and the expression "welding" as used herein is intended to include all unions in which a portion of the material is fused.

A particular feature of the invention is the provision of an improved mechanism for bringing together the edges of a container or the like to be welded, shearing excess metal from the edges and crimping the material adjacent the edges to be sealed, prior to the welding operation. Such crimping has been found to facilitate the welding of the edges.

Another feature of the invention is the providing of means for breaking up bubbles, or froth, in the tubes after they have been filled, thereby releasing air entrapped in such bubbles. The presence of such air and possibly the thin film forming the walls of the bubbles has been found to interfere with the welding operation.

Further objects, features and advantages of the invention will be apparent and the invention will be better understood from the detailed description of an illustrative form of the same which will now be given in conjunction with the accompanying drawings, in which Fig. 1 is a plan view of apparatus containing a preferred embodiment of the invention, showing the relative locations of the stations at which various operations are performed and the apparatus for performing such operations;

Fig. 2 is a front elevation of the apparatus shown in Fig. 1;

Fig. 2A is a cross-sectional view of the defrothhead;

Fig. 3 is a cross-sectional view of certain fluxapplying mechanism, taken along the line 3—3 of Fig. 2;

Fig. 5 is a rear elevation of the apparatus shown in Fig. 1;

Fig. 6 illustrates principally the filling, tubeclosing, crimping and shearing mechanisms, being taken substantially along the line 6—6 of Fig. 1;

Fig. 7 shows the conveyor driving mechanism and the welding mechanism, being taken substantially along the line 7—7 of Fig. 1, the welding rod being raised in a non-welding position;

Fig. 8 is a partial view of the welding mechanism showing the welding rod in welding position;

Figs. 9, 11 and 12 illustrate details of construction of the mechanism for moving the welding rod;

Tube conveyor

As the apparatus which conveys the tubes from station to station for the performance of the various operations is more or less well known, only such description of it will be made as is necessary to complete understanding of the present invention. This apparatus is shown more particularly in Figs. 1, 2, 4-7.

Figure 1:
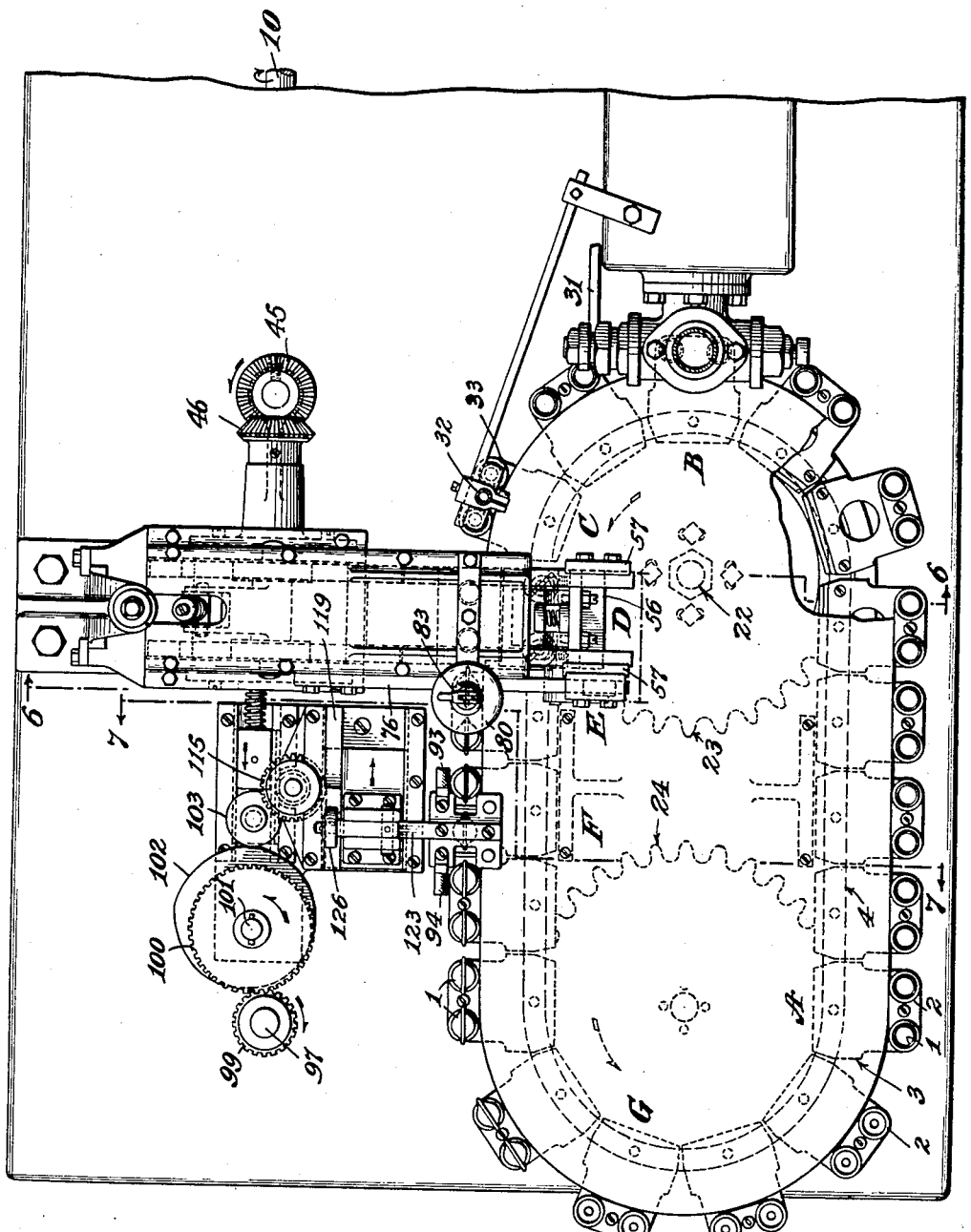

Referring first to Fig. 1 which shows the relative positions of the various stations: At the loading station, indicated generally by the letter A, the tubes 1 are placed in the tube holders, or cups 2 which are arranged in pairs upon the blocks 3 connected to the conveyor chain 4. The tubes are carried around to a filling station B at which the desired substance is permitted to flow into the tubes. At station C air is blown down upon the contents of the tubes to destroy air bubbles, or froth, which would interfere with the subsequent welding of the open ends. This is referred to as the defrothing station. At the next station D, which may for convenience be referred to as the tube-closing station, the open ends of the tubes are brought together, sheared and crimped, i. e., provided with interlocking depressions as hereinafter described. Then at E flux is applied to the tubes while they are passing to the welding station F. Finally the tubes arrive at station G where they are removed from the conveyor.

Figure 4:
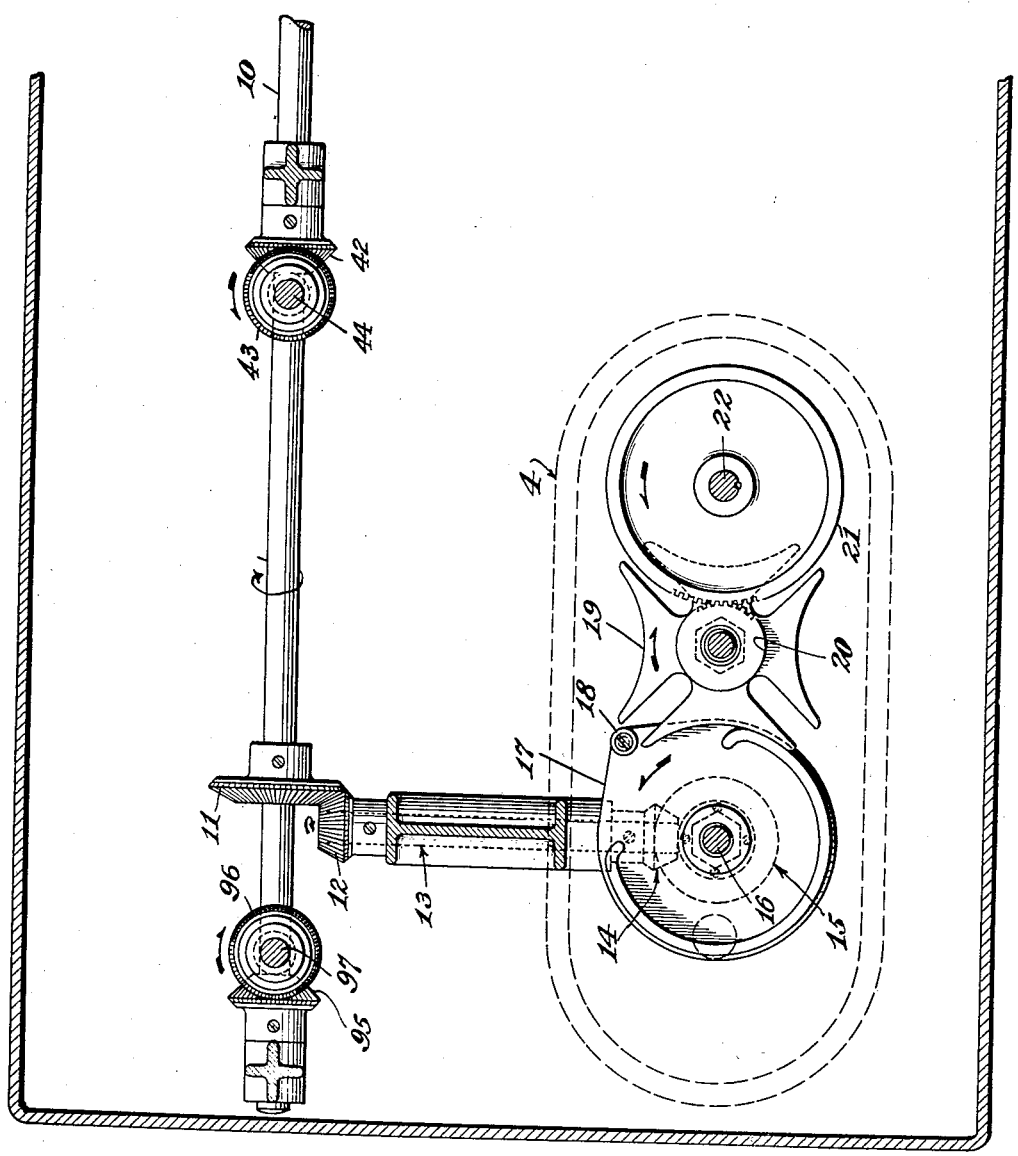
Fig. 4 is a horizontal sectional view taken along the line 4—4 of Fig. 2, showing a part of the driving mechanism, including the Geneva movement for imparting an intermittent movement to the tubes passing from station to station.

The conveyor chain 4 is moved intermittently so that the tubes come to a complete stop at each of the stations. The mechanism for so moving this chain will now be described with particular reference to Figs. 2, 4, 5-7. Power is transmitted from the drive shaft 10, driven by a suitable source of power (not shown), through the bevel gears 11 and 12 to a countershaft 13. At the other end of this shaft (see Figs. 4 and 7) there are bevel gears 14 and 15 which transmit power to a vertical shaft 16 upon which the constantly rotating pin-carrying disc 17 of a Geneva movement is mounted. The pin 18 engages the starwheel 19 and causes it to turn intermittently, one-quarter turn for each revolution of the pin disc 17, in a well-known manner. This star-wheel has associated with it a gear 20 which engages the gear 21 mounted upon the vertical shaft 22 as shown in Figs. 4 and 7. At the upper end of this shaft, the driving sprocket 23 (Fig. 1) is mounted in engagement with the conveyor chain 4 for moving it intermittently from station to station. The conveyor chain also passes around an idler sprocket 24.

Filling and defrothing stations

When the tubes are at rest at the filling station B, the desired substance is fed into them through the spouts 30 (Fig. 6) under control of a valve actuated by the member 31 (Fig. 2). The tubes may be filled singly or in multiples, as desired. In the machine illustrated the tubes are carried in pairs from one station to another and two of them are simultaneously subjected to the various operations.

It has been found that in filling the tubes with certain liquids, such as a hair tonic, air bubbles are formed and these interfere with the proper welding of the closure for the filling end of the tubes. Hence it is desirable to provide some defrothing means between the filling and welding stations. The defrothing apparatus located at station C is clearly shown in Figs. 2 and 2A. It comprises a pipe 32 through which air is supplied to a header 33 from which it flows through two nozzles 34 located a short distance above the tubes and adapted to direct streams of air into the tubes to break up air bubbles or froth.

Tube-closing mechanism

Figure 15:
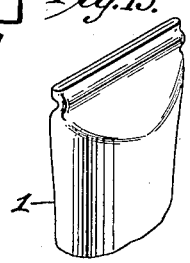
Fig. 15 shows a crimped and sheared end of a tube.

The mechanism located at station D brings the open, or filling ends of the tubes together preparatory to welding, crimps, or forms interlocking depressions in the sides of the tubes adjacent the ends to be welded, as shown in Fig. 15, to hold the tube edges together before welding and trims these ends at a uniform, predetermined height with respect to the welding rod hereinafter described.

Since the tubes delivered to the machine usually vary slightly in length, it is desirable to trim them at a uniform height so that the ends of the tubes to be sealed will contact the welding wire in exactly the same manner.

As shown in Fig. 6, the jaws 40 and 41 which force the sides of the tube together, are in open position. The mechanism for bringing the jaws together and also for opening them will now be described with particular reference first to Figs. 5 and 6. From the main shaft 10, power is transmitted through the bevel gears 42 and 43 to a vertical shaft 44 and thence through the bevel gears 45 and 46 to a horizontal crankshaft 47. As shown in Fig. 6, this crankshaft rocks the crank 48 to which is pivotally connected a yoke 49 whose oscillation rocks the segmental gear members 50. The connection between the crank 48 and the yoke 49 is yieldable by virtue of the spring 51 to prevent breakage of parts if the jaws 40 and 41 should close on a hard, unyielding object, such as a wrench, which might fall between these jaws as they are closing. The upper gear segments engage upper rack members 52 at the forward end of which the movable jaw 41 is mounted as hereinafter described. The lower gear segments engage lower rack members 53 which support the second movable jaw 40.

Figure 10:
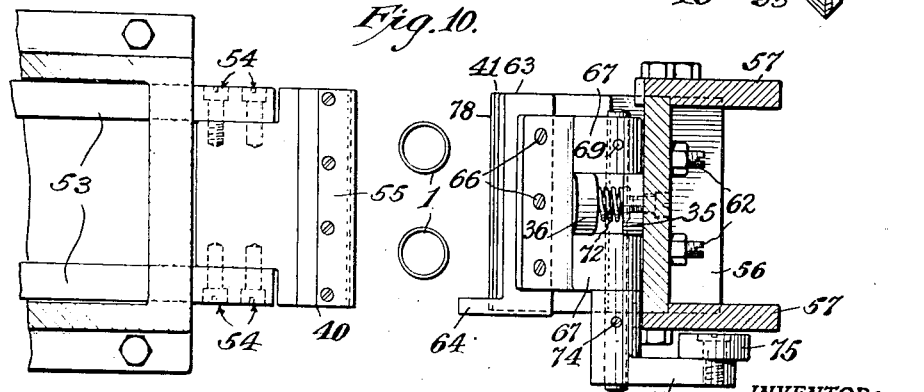
Fig. 10 is a plan view in partial section, of the tube closing and shearing mechanism.
Figure 13:
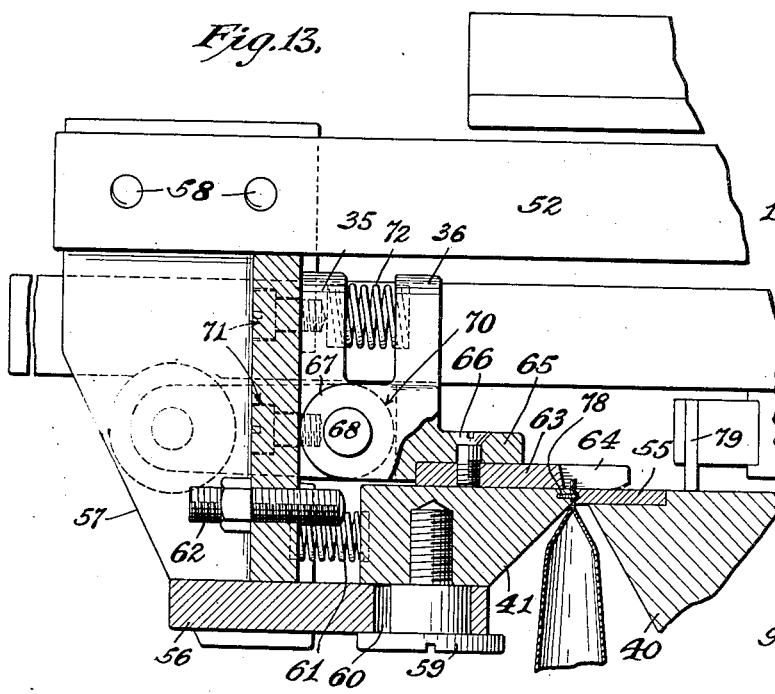
Fig. 13 is a detailed view of the shearing mechanism, prior to shearing.
Figure 14:
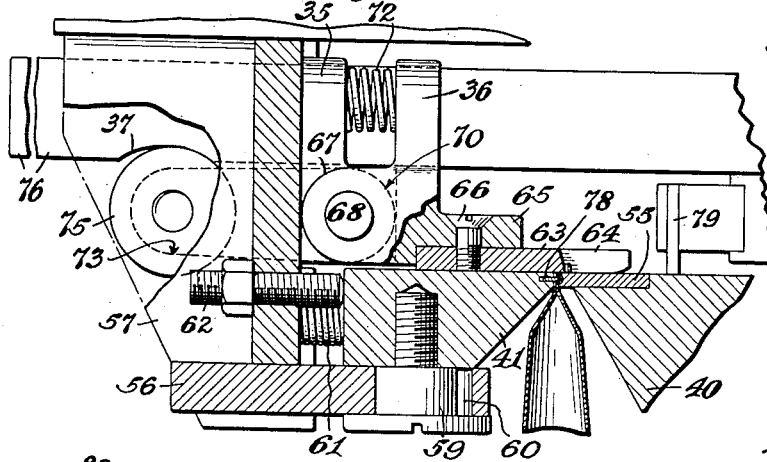
Fig. 14 is a similar view, after shearing.

As shown in Figs. 6 and 10, the jaw 40 may be detachably secured to the forward ends of the lower rack members 53, by screws 54. And as shown in Figs. 13 and 14, the under surfaces of the opposed faces of the jaws 40 and 41 are beveled so as to provide ample clearance for the main bodies of the tubes when the jaws are fully closed. A member 55 is secured, for example by the screws illustrated, to the leading edge of the jaw 40 and this member rather than the jaw itself contacts the tubes. The working edge of the member 55 has a longitudinal recess cut in it to accommodate crimps or depressions, put in the tubes by a complementary bar 78 associated with the jaw 41. The resulting crimps, or interlocking depressions, illustrated in Fig. 15, help to hold the pinched edges of the tube together and to facilitate the welding of such edges.

The construction of jaw 41 is clearly shown in Figs. 6, 10, 13 and 14. This jaw is slidably supported upon a flat plate 56 which is held in grooves in the side members 57 (see also Fig. 2). The upper portions of these members have grooves which accommodate the upper rack member 52 and are secured thereto by the bolts 58. The jaw 41 is slidably held on the plate 56 by a screw 59 which passes through a slot 60 in the plate 56 and is normally urged in the direction of the tubes by the spring 61. The limit of its backward movement (within the range permitted by the slot 60) may be varied by means of the adjustable bolt 62. The movement of the jaw 41 with respect to the plate 56 is illustrated in Figs. 13 and 14, the former showing the jaw in its most forward position, the latter in retracted position.

The shear blade 63 is slidable on top of the jaw 41 and is provided with a projection 64 on one side thereof which helps to guide the blade and to align the jaws 40 and 41 as the blade moves across the jaws during the shearing operation. This blade may be secured to a member 65 as by bolts 66. The member 65 has two spaced hubs 67 (see Fig. 10) through which a shaft 68 passes. This shaft is secured to one of the hubs by means of a pin 69 so that rocking of the shaft will cause the member 65 and the shear blade 63 which it carries, to rock, as hereinafter explained. Shaft 68 is rotatably supported in a bearing 70 located between the hubs 67 and held in position by means of the bolts 71, the upper of which extends into a projecting portion 35 in alignment with the upper portion 36 of the plate holder 65. A spring 72 is interposed between the parts 35 and 36 as shown clearly in Figs. 13 and 14 and normally urges the upper part 36 of the blade holder 65 away from the bearing member so that the shear blade 63 is normally urged toward contact with the upper surface of the jaw 41.

The means for lifting the shear blade 63 from the jaw 41 will now be described with reference to Figs. 10, 13 and 14. An arm 73 is secured to one end of the shaft 68 by means of a set screw 74 and carries at one end the cam roller 75. This roller contacts the lower edge of the bar 76 which is fastened to the apparatus by means of the bolts 77 (see Fig. 6) and has a recess 37 adapted to accommodate the roller 75 thereby permitting the shear blade 63 to be brought into operating position.

In operation, the jaws 40 and 41 are brought together by the opposite movements of the upper and lower rack bars 52 and 53 as heretofore explained. During the first part of this movement the cam roller 75 rides along the straight edge of the bar 76 and keeps the shear blade slightly away from the top surface of the jaw 41, as will be clearly seen in Fig. 6. The upper ends of the tubes are pressed together and closed and a crimp is put therein by means of the bar 78 in the upper edge of the jaw 41, this bar cooperating with the slot in the edge of the member 55 associated with the jaw 40. This action is shown in Fig. 13. Thereafter the cam roller 75 comes into the recess 37 in the bar 76 and permits the spring 72 to force the shear blade 63 into contact with the top surface of the jaw 41. As the upper and lower rack members continue to urge the jaws 40 and 41 together, the jaw 41 slides upon the plate 56 against the action of the spring 61. The shear blade 63 continues its forward movement and shears the upper edge of the tubes as will be seen in Fig. 14. When the shearing action has been completed the movements of the upper and lower rack members are reversed and the shear blade is retracted across the top surface of the jaw 41. The spring 61 urges the jaw 41 forward with respect to the shear blade 63 until the limit of its forward movement is reached and thereafter the jaw 41 and the shear blade are retracted to the open position shown in Fig. 6. A scraper 79 may be secured to the stationary bar 76 for removing the cut off portions of the tube from the jaw 40.

It will be noted that the jaws are made wide enough to operate upon whatever number of tubes are carried by each unit in the conveying system. In the illustrated example, the jaws operate upon two tubes simultaneously as shown in Fig. 10.

*Application of flux*

After the tubes have been sheared by the apparatus just described, and while they are traveling to the welding station F, a suitable welding flux is applied to the sheared ends of the tubes. The fluxing apparatus, shown in Fig. 3, comprises a reservoir 80 containing a supply of the flux solution and a feed pipe 81 through which the flux flows to a wick 82 which contacts with the tubes 1 as illustrated and thereby applies the flux to them. The rate of supply of the flux may be controlled by a valve 83 and the height of the wick 82 may be varied by turning the small wheel 84.

*Welding mechanism*

The ends of the tubes may now be sealed by means of a wire or rod 90, shown in Figs. 11 and 12. This wire has a high electrical resistance and may be made of nickel, chromium alloy or other suitable material. It is preferably U-shaped with its parallel branches so spaced apart that the two tubes on the conveyor at the welding station can be welded simultaneously. This rod may be held in the binding posts 91 depending from the four corners of the H-shaped supporting member 92. The necessary electrical connections may be made through the cables 93 and 94 to a transformer capable of supplying the desired heating current. It is an important feature that this wire is maintained at a red heat, say between 1000° and 1500° F., and that means, well known in the art, is included for varying the current supplied so that the temperature of the wire may be varied as desired.

The welding rod 90 is reciprocated along the line of travel of the tubes on the conveyor system in the region of the welding station F and is adapted to weld during both its movements. For example, when a pair of tubes has reached the welding station, it can be assumed that the two parallel branches of the welding rod 90 lie in advance of the tubes. While the tubes remain stationary the rod electrically heated above the fusing point of the tube material, is moved against the former direction of travel of the tubes and across their upper ends causing the same to be welded. After the two branches of the welding rod have passed over the tubes, the rod comes to rest and then by another movement is carried out of the path of the tubes until another pair of tubes is moved into the welding station. Then the welding rod is moved back into the path of the upper edges of the tubes and subsequently shifted in the same direction as the travel of the tubes and welds these new tubes. The mechanism for so reciprocating the welding rod and for moving it into and out of the path of the tubes will now be described with particular reference to Figs. 1, 5, 7, 9, 11 and 12.

Figure 9:
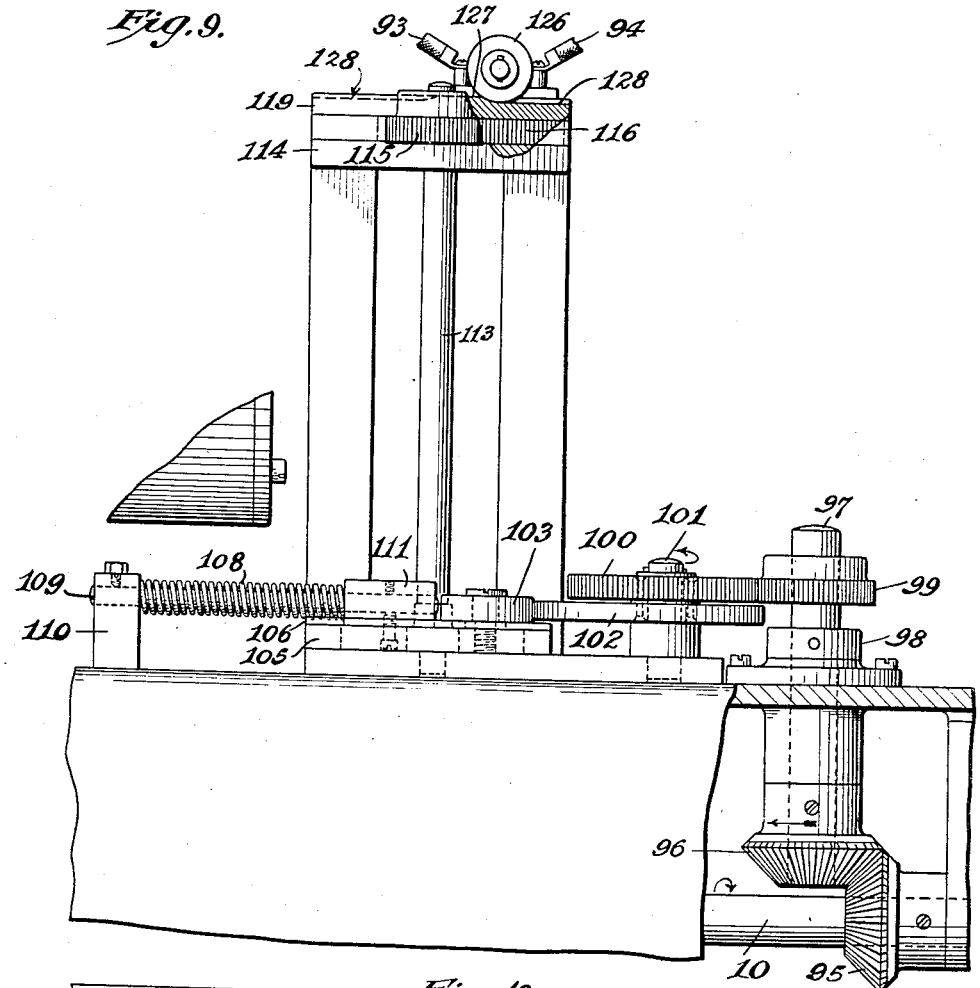

Referring first to Figs. 1 and 9, power is transmitted from the main drive shaft 10 through the bevel gears 95 and 96 to the vertical shaft 97 supported in a bearing 98. A spur gear 99 is mounted on the shaft 97 and engages a larger gear 100 rotatable on the vertical pin 101. A cam 102 also rotatable on the pin 101 is fastened to the gear 100 so as to rotate with it. The periphery of the cam 102, having different length radii from the center of the pin 101, as shown in Fig. 1, contacts the periphery of a cylindrical follower 103. As also shown in Figs. 11 and 12, this follower is rotatably supported on a sliding block 104 held in ways formed by the strips 105 and 106. One edge of this block is provided with rack teeth 107.

It will be readily understood from the construction thus far described that the rotation of the cam 102 will cause the sliding block 104 to move in one direction, i. e., away from the center of the pin 101 as the longer radii of the cam 102 comes into contact with the follower 103. Movement in the opposite, or return, direction is produced by means of a spring 108 supported on the rod 109 and lying between a fixed block 110 on the apparatus and a block 111 secured to the sliding block 104. This spring normally urges the sliding block 104 in the direction opposite the movement caused by the cam 102 and keeps the follower 103 in contact with the cam 102.

The reciprocatory movement of the sliding block 104 is transmitted to the welding rod 90 by the arrangement clearly shown in Figs. 7, 11 and 12. The rack 107 engages a pinion 112 mounted on the lower end of the vertical shaft 113. The upper end of this shaft projects through a hole in the raised platform 114 and has mounted upon it a pinion 115. The latter engages the rack teeth 116 cut in one edge of the sliding block 117 mounted upon the platform 114 in the ways formed by the strips 118 and 119. The welding rod is supported from a block 120 which may be secured to the sliding block 117 by screws as indicated at 121. The block 120 is provided with two parallel upwardly extending flanges 122 between which the arm 123 is pivotally supported on the pin 124. The insulated, welding, bar-supporting member 92 may be fastened to the end of the arm 123 by the screws 125.

It has been found that an oxide coating is formed upon the welding wire after a number of welds have been made. As this coating interferes with welding, it is desirable to use a new portion of the wire from time to time and when the entire operating portions of the wire have been used, it may be removed for cleaning and replaced by another wire. Adjustment of the wire to a new position may be effected either by loosening the screws 125 and tapping the member 92, or by some special adjustable mounting. Thus, if desired, a threaded rod engaging a nut carried by member 92 and mounted in bearings on the arm 123 may be employed, the member 92 being slidable along the arm 123 as the threaded rod is turned, as will be readily understood by those skilled in the art.

On the other end of the arm 123 there is a roller 126 which, as shown, travels along the top surface of one of the guides 119. As shown more clearly in Fig. 9, this surface consists of a raised, central portion 127 and depressed end portions 128. The weight of the arm 123 is so distributed that the roller 126 is held in contact with surfaces 127 and 128 or a spring may be employed to insure this contact and the welding rod is lowered to operating position, as in Fig. 8 when the raised surface 127 is engaged, or raised to inoperative position, as in Fig. 11 when the roller 126 contacts the depressed portions 128.

As the lower sliding block 104 is reciprocated as above described, it causes the vertical shaft 113 to oscillate, which in turn causes the upper sliding block 117, carrying the welding rod 90, to reciprocate. The surfaces 127 and 128 are so located with respect to the tubes positioned at the welding station that welding rod 90 is lowered during its initial movement just in advance of the edges to be welded and is held lowered throughout the actual welding of the tubes but is raised during the period of movement of the tube conveyor so that the welded tubes may be carried away and new tubes may be brought to the welding station.

It will be readily understood that various other arrangements may be employed for removing the welding wire from the path of the tubes so as to permit them to be indexed. Thus, for example, the welding wire could be moved transversely of the tube movement, i. e., in the direction of the arm 123, so as to lie out of the path of the tubes during indexing.

Figure 16:
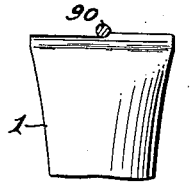
Fig. 16 illustrates the position of the welding rod with reference to the edges to be welded.
Figure 17:
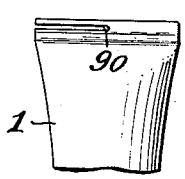
Fig. 17 illustrates a modification in which the welding rod both shears and welds the tubes.

Two modifications of the welding operation are shown in Figs. 16 and 17. In the arrangement shown in Fig. 16 the welding rod 90, in operating position, is slightly below the sheared, upper edges of the tube and is adapted to melt these edges to a fairly substantial depth. In the modification shown in Fig. 17, a smaller diameter welding rod 90 is located, when in operative position, some distance below the top edges of the tubes and is adapted to shear off excess material and at the same time weld the tubes. With such an arrangement the shear mechanism previously described may be eliminated and the welding flux is preferably applied to the inside surfaces of the tubes before the ends are pressed together, as by means of a dauber, or the flux may be sprayed on.

Figure 18:
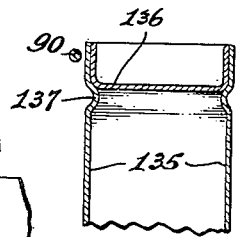
Figs. 18 and 19 show in vertical section and plan, respectively, the application of the present invention to a container or tube, having a cylindrical portion which is to be sealed by a separate cap or closure.
Figure 19:
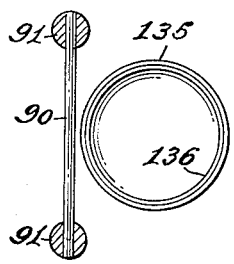

In Figs. 18 and 19 the invention is shown as applied to a container, or tube 135, having a cylindrical end which is to be sealed by a cup-shaped closure 136. A bead 137 may be formed in the wall of the container to support the closure as it is inserted. Before the closure is inserted into the container the outer surface of its cylindrical flange portion may be coated with a suitable flux. After it has been inserted, the wire 90 may be moved across the top edges of the tube and closure and effect the seal in substantially the same manner as previously described.

It should be understood that the present invention is not limited to the sealing of containers or tubes, but is applicable to the welding of soft metal sheets, or the like, for a variety of purposes. While an illustrative machine has been described and shown in considerable detail, it will be understood that numerous changes may be made in the form and construction of the several parts and in their relation to each other. In some instances, at least, the defrothing means may be completely omitted. So also the flux applying means may be considerably modified or even omitted under various circumstances. Other changes will readily occur to those skilled in the art. The terms and expressions used herein are to be regarded as terms of description and not of limitation.

I claim:

1. The process of hermetically sealing containers which comprises closing the containers in such manner as to provide projecting adjacent edges and thereafter welding such edges together and removing excess material by passing a wire heated by the conduction of electricity therethrough to a red heat across the containers and slightly below such edges.

2. The process of closing the filling end of a collapsible tube which comprises pressing opposite sides of the tube adjacent such end until the upper edges thereof have been brought together, forming interlocking depressions in the sides thus brought together, shearing excess material from such edges, and thereafter welding such sheared edges.

3. The process of closing the filling end of a collapsible tube which comprises pressing opposite sides of the tube adjacent such end until the upper edges thereof have been brought together, forming interlocking depressions in the sides thus brought together substantially parallel and close to such edges, shearing excess material from such edges, and thereafter uniting such edges by passing thereacross a rod heated sufficiently to fuse the metal of such edges.

4. The process of closing the filling end of a collapsible tube which comprises pressing opposite sides of the tube adjacent such end until the upper edges thereof have been brought together and thereafter simultaneously cutting off excess material and welding such edges by passing a heated rod through the sides thus brought together.

5. The process of closing the filling end of a collapsible tube which comprises pressing opposite sides of the tube adjacent such end until the upper edges thereof have been brought together, forming interlocking depressions in the sides thus brought together and thereafter simultaneously cutting off excess material and welding such edges by passing a heated rod through the sides thus brought together between said depressions and the adjacent end of the tube.

6. A collapsible tube-closing apparatus comprising a tube holder, means positioned on opposite sides of the tube and movable toward each other to close the filling end of the tube, means for forming interlocking depressions in the sides of the tube adjacent the closed end, means for cutting off the closed end of the tube at a predetermined height and means for welding this end.

7. A collapsible tube-closing apparatus comprising a tube holder, reciprocable jaws on opposite sides of the tube for closing the filling end of the tube, a shear blade mounted on one of said jaws and adapted to cut off the closed end of the tube at a predetermined height while it is held between said jaws, a projection on one of said jaws cooperating with a recess in the other jaw to form interlocking depressions in the sides of the tube adjacent the closed end and means for welding this end.

8. A collapsible tube-closing apparatus comprising a tube holder, reciprocable members on opposite sides of the tube and movable toward each other, a jaw supported on each of said members adapted to contact such sides and close the filling end of the tube, a shear blade slidable on one jaw and adapted to cut off the closed end of the tube at a predetermined height while it is held between said jaws, one of said jaws being slidable on its supporting member whereby the shear blade may continue to advance to the tube when said jaw is in stationary contact with the tube, and means for welding said end of the tube.

9. A collapsible tube-closing apparatus comprising a tube holder, reciprocable members on opposite sides of the tube and movable toward each other, a jaw supported on each of said members adapted to contact such sides and close the filling end of the tube, a shear blade pivotally supported on one of said members and slidable on the jaw supported thereby and adapted to cut off the closed end of the tube at a predetermined height while it is held between said jaws, one of said jaws being slidable on its supporting member whereby the shear blade may continue to advance to the tube when said jaw is in stationary contact with the tube, means for lifting the shear blade out of engagement with the end of the tube during its retractive movement and means for welding said end of the tube.

10. A collapsible tube-closing apparatus comprising a tube holder, reciprocable members on opposite sides of the tube and movable toward each other, a jaw supported on each of said members adapted to contact such sides and close the filling end of the tube, means on said jaws for forming interlocking depressions in the sides of the tube adjacent the closed end and a shear blade slidable on one jaw and adapted to cut off the closed end of the tube at a predetermined height while it is held between said jaws, one of said jaws being slidable on its supporting member whereby the shear blade may continue to advance to the tube when said jaw is in stationary contact with the tube and means for welding said end of the tube.

11. A container-sealing apparatus comprising a series of container holders, means to advance said container holders to a welding station, welding means comprising a welding rod, said rod being supported on a pivoted arm, said arm being carried by a member reciprocating the welding rod in one direction for one welding operation and in the opposite direction for the next welding operation on a succeeding container, and means for rocking said arm to lift said rod out of welding position at predetermined times between successive welding operations.

12. The process of hermetically sealing collapsible tubes, which comprises closing the filling end of a tube by forming opposing wall surfaces with the end portion of the tube and providing juxtaposed edges at the end of the tube, impressing interlocking areas in the opposing surfaces to facilitate welding of the juxtaposed edges, the interlock formed being such as to be capable of holding the juxtaposed edges in contact with each other without necessitating external support, and thereafter welding the juxtaposed edges.

PALMER J. LATHROP.